United States Patent
McConnell et al.

(10) Patent No.: US 7,634,568 B2
(45) Date of Patent: Dec. 15, 2009

(54) METHOD AND SYSTEM FOR FACILITATING SERVICES IN A COMMUNICATION NETWORK THROUGH DATA-PUBLICATION BY A SIGNALING SERVER

(75) Inventors: Von K. McConnell, Leawood, KS (US); Arun Santharam, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1892 days.

(21) Appl. No.: 10/071,833

(22) Filed: Feb. 7, 2002

(65) Prior Publication Data
US 2003/0149774 A1 Aug. 7, 2003

(51) Int. Cl.
*G06F 15/16* (2006.01)
(52) U.S. Cl. .................. 709/227; 370/312; 370/345; 455/434; 455/517
(58) Field of Classification Search ............... 709/227; 370/312, 345; 455/434, 517
See application file for complete search history.

(56) References Cited
U.S. PATENT DOCUMENTS

| | | | |
|---|---|---|---|
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 6,014,556 A | 1/2000 | Bhatia et al. | |
| 6,032,051 A | 2/2000 | Hall et al. | |
| 6,119,017 A | 9/2000 | Cassidy et al. | |
| 6,178,323 B1 | 1/2001 | Nagata | |
| 6,381,467 B1 | 4/2002 | Hill et al. | |
| 6,477,150 B1 * | 11/2002 | Maggenti et al. | 370/312 |
| 6,490,452 B1 | 12/2002 | Boscovic et al. | |
| 6,526,377 B1 | 2/2003 | Bubb | |
| 6,725,053 B2 * | 4/2004 | Rosen et al. | 455/518 |

(Continued)

FOREIGN PATENT DOCUMENTS

EP  0 817 457  1/1998

(Continued)

OTHER PUBLICATIONS

Dirk Kutscher/ Jorg Ott, "The Message Bus—A Communication & Integration Infrastructure for Component-based Systems," White Paper, Jan. 2000.

(Continued)

*Primary Examiner*—George C Neurauter, Jr.
*Assistant Examiner*—Kyung H Shin (57) ABSTRACT

A mechanism is disclosed for facilitating the performance of communication services in a communication network. An enhanced proxy server receives a signaling message and proxies the message to an application server. Further, the enhanced proxy server responds to the message by extracting a set of data from a data store and making the set of data available for use by the application server in responding to the signaling message. Similarly, a registration server may receive a signaling message from a communicating entity and may responsively make data available for use by an application server in responding to signaling messages regarding the communicating entity.

41 Claims, 6 Drawing Sheets

U.S. PATENT DOCUMENTS

| | | | |
|---|---|---|---|
| 6,771,639 B1* | 8/2004 | Holden | 370/352 |
| 6,882,850 B2* | 4/2005 | McConnell et al. | 455/453 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1* | 12/2002 | Harris et al. | 370/345 |
| 2003/0008657 A1 | 1/2003 | Rosen et al. | |
| 2003/0021264 A1 | 1/2003 | Zhakov et al. | |
| 2003/0114156 A1* | 6/2003 | Kinnavy | 455/434 |
| 2003/0149774 A1* | 8/2003 | McConnell et al. | 709/227 |

FOREIGN PATENT DOCUMENTS

| | | |
|---|---|---|
| EP | 0 984 608 | 3/2000 |

OTHER PUBLICATIONS

Ott, Perkins and Kutschr, "A Message Bus for Local Coordination," Network Working Group, Internet-Draft, May 30, 2001.

International Search Report from International Application No. PCT/US02/36055, dated Apr. 10, 2003.

International Search Report from International Application No. PCT/US2003/02950, dated Jan. 30, 2003.

Office Action from Application No. 10/067,080, dated May 21, 2003.

Office Action from Application No. 10/067,080, dated Apr. 27, 2004.

International Search Report from International Application No. PCT/US02/31411, dated Mar. 4, 2003.

International Search Report from International Application No. PCT/US02/29575, dated Dec. 10, 2002.

International Search Report from International Application No. PCT/US03/03021, dated Jun. 18, 2003.

U.S. Appl. No. 10/277,465, filed Oct. 22, 2002 entitled "Method for Call Setup Using Short Data Bursts" (Sprint Docket 1999).

3rd Generation Parntership Project 2 "3GPP2", Fast Call Set-Up, Version 1.0, Apr. 15, 2002.

Mobile Tornado, http://www.mobiletornado.com/products_iprsptt.html, printed from the World Wide Web on Jan. 27, 2003.

"Qualcomm Chats Up 'Push-to-Talk'," http://siliconvalley.internet.com/news/print.php/953261, printed from the World Wide Web on Jan. 27, 2003.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G-IP Networks," Internet Engineering Task Force, Internet Draft, Oct. 1999.

Campbell and Sparks, "Control of Service Context Using SIP Request—URI," Network Working Group, Apr. 2001.

Ericsson, www.telecomcorridor.com/wireless%20horizons/1Coyne.pdf, printed from the World Wide Web on Jun. 27, 2001.

TR45, Medium Access Control (MAC) Standard for cdma2000 Spread Spectrum Systesm, IS-2000-3, Jul. 12, 1999.

3rd Generation Partnership Project 2 '3GPP2', "Interoperability Specification (IOS) for CDMA 2000 Access Network Interfaces—Part 3 Features," Nov. 2001.

Perkins, "IP Mobility Support," Internet Engineering Task Force Request for Comment 2002, Oct. 1996.

Perkins, "IP Encapsulation within IP," Internet Engineering Task force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task force Request for Comment 2616, Jun. 1999.

Rigney et al., "Remote Authetication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

Oma, Discussion and definitions on PoC Floor Control, Input Contribution, Doc #OMA-REQ-2003-0375-PoC_Floor_Control, Jun. 2, 2003.

Oma, "PoC Use case: Mobile—PC Example," Input Contribution, Doc #OMA-REQ-2003-0323 PoC Mobile-PC use case, May 5, 2003.

Oma, "PoC Use case: Multimedia Group Call Example," Input Contribution, Doc #OMA-REQ-2003-0306-PoC UseCase-group-multimedia-scenario, May 6, 2003.

Oma, "PoC Use case: Examples of User Requirements," Input Contribution, Doc #0MA-Req-2003-0305-PoC Use Case, May 6, 2003.

Oma, "Inputs for PoC Requirements Document," Input Contribution, Doc #OMA-REQ-2003-0367-PoC_Input_Motorola, May 29, 2003.

Oma, "Push to Talk over Cellular (PoC)," Version: 0.1.6, May 12, 2003.

* cited by examiner

METHOD AND SYSTEM FOR FACILITATING SERVICES IN A COMMUNICATION NETWORK THROUGH DATA-PUBLICATION BY A SIGNALING SERVER

BACKGROUND

1. Field of the Invention

The present invention relates to network communications and more particularly to facilitating services in a communication network.

2. Description of Related Art

As a general matter, it is known to provide services for subscribers over communication networks. By way of example, and without limitation, three such services are (i) establishing a "push-to-talk" session for a requesting party, (ii) multicasting an instant message from an initiating party to a defined group of other parties, and (iii) providing voice mail service for unavailable parties. Many other services exist as well or will be developed in the future, but these three services will be used as examples throughout this description. Therefore, example arrangements and operation of each of these services will first be described briefly here.

a. Initiating a Push to Talk Session

"Push-to-talk" (PTT) service, as it has come to be known, involves establishing an "instant" communication session between two or more parties over a communication network. (Note that PTT does not literally provide for "instant" (i.e., immediate) session establishment; however, the session establishment is sometimes considered "instant" in the sense that a very quick connection is usually established between the participating parties. Note also that PTT service normally concerns voice communications; but the "PTT" concept extends equally to communication of other media, such as video for instance.)

Generally, to establish such a session, a PTT server on a network establishes and bridges together communication legs among a plurality of users. To facilitate this, a PTT server normally maintains a group-database or registry that indicates groups of users who are designated to communicate with each other.

When a user wants to initiate a PTT session, the user sends an initiation request to the PTT server. In response, the PTT server refers to the group-database to identify members of that user's group (also referred to as the user's "buddies"). And the PTT server establishes a communication leg with the initiating user and respective communication legs with each identified member of the user's group and bridges those legs together so that they can communicate with each other.

PTT service is particularly well suited for wireless communications, especially where users employ wireless handsets (mobile stations) that are able to engage in packet-data communications. Under current industry standards, for instance, a "3G" mobile station can communicate over an air interface with a base transceiver station (BTS) and in turn with a base station controller (BSC). For conventional "voice" communications, the BSC is then linked with a mobile switching center, which provides connectivity to the public switched telephone network (PSTN). Further, for data communications, the BSC is also linked with a packet data serving node (PDSN), which provides connectivity with a packet-switched network such as the Internet. (In later generation wireless networks, the BTS and/or BSC may themselves sit as nodes on a packet-switched network, providing more of an end-to-end packet-based solution.)

A 3G mobile station then typically includes logic to digitize, encode and packetize voice and/or other media and to send the resulting packets over a point-to-point protocol (PPP) channel to the PDSN for transmission in turn over the packet-switched network. Similarly, the mobile station includes logic to receive packets over the PPP channel from the packet-switched network, and to depacketize and recover the underlying media and to play out the media to a user. Thus, a 3G mobile station, like a multi-media personal computer, can allow a user to engage in media-over-IP (e.g., voice-over-IP (VoIP)) communications.

To facilitate PTT service, a mobile station can be programmed with a PTT application, which, when invoked by a user, would cause a PTT initiation-signal to be sent into the network for transmission to a PTT server. The initiation signal can take any of a variety of forms. By way of example, it may be an "INVITE" request message pursuant to the industry standard session initiation protocol (SIP). According to SIP, a user-agent module on the mobile station would generate the INVITE and send the INVITE to a proxy server on the network. The INVITE might indicate generally a request for the user to engage in a PTT session. Conventionally, the SIP proxy server would then forward or "proxy" the INVITE to a suitable PTT server.

Upon receipt of the INVITE, the PTT server would then query its group database to identify members of the user's group and might then engage in SIP signaling to set up communication sessions (conference legs) with each member and with the initiating user. After setting up each leg, the PTT server would then bridge them together so that the parties can communicate with each other. This entire setup process might occur in a matter of milliseconds. Therefore, from the user perspective, the process can appear instantaneous.

b. Multicasting an Instant Message

Instant messaging (IM) service involves quickly communicating a message from a user's communication terminal to one or more other users. IM services can operate in any of a variety of ways.

As a general matter, to facilitate IM service, an IM server on a network will receive subscriptions from users requesting to be notified when other users are online and available to receive instant messages. When a user goes online, the user may send a registration message to the IM server, indicating to the IM server that the user is online and available. Thus, when the IM server receives a registration message indicating online status of a user as to whom another user has subscribed to be notified, the IM server may then notify the subscribing user accordingly.

With this arrangement, an IM user may then send an instant message to one or more other users that the sender knows are available to receive the message. According to SIP, the sending user can do this by sending a SIP "MESSAGE" to each designated other user. More particularly, the sending user would send the MESSAGE to a SIP proxy server, designating the recipient's SIP ID in the MESSAGE. The proxy server would then proxy the MESSAGE to the network address of that recipient SIP user.

To multicast an instant message to a designated group of recipients, a user might send the instant message to the IM server, and the IM server might then forward the message to members of the sender's group. As with PTT service, an IM server may thus normally maintain a group-database, which indicates groups of users who are designated to receive multicast instant messages (or other sorts of messages, for that matter) from each other or from particular users. And the IM server may refer to the group-database to determine endpoint destinations of an instant message.

Continuing with SIP as the example signaling protocol, for instance, a SIP user may send an instant message as a SIP MESSAGE to a proxy server on the network. The MESSAGE might indicate generally a request to send the message to the user's group. In response, the SIP proxy might then proxy the MESSAGE to the IM server. Upon receipt of the MESSAGE, the IM server may then query its group-database to identify members of the sender's group, and the IM server may then send the MESSAGE respectively to each available member of the group.

c. Providing Voice Mail Service

Voice mail service is exceptionally well known. Generally, when an initiating party attempts to establish a communication with a terminating party and the terminating party is unavailable, a network entity may instead establish a communication session between the initiating party and a voice mail server. The voice mail server would then play an outgoing message and receive and record a message from the initiating party. The voice mail server may then later play the recorded message to the terminating party.

SIP can be used to facilitate voice mail service as well. According to SIP, an initiating SIP user would cause an initiating user agent to send an INVITE to a proxy server, indicating a request to establish a communication session with a terminating SIP user. The proxy server would then forward that INVITE to the network address of the device where the terminating SIP user is located. With SIP, If a user agent at that terminating address does not then respond to the INVITE by sending a conventional SIP "200 OK" response message back to the proxy server within a particular time period, the proxy server might then cancel the INVITE to the terminating SIP user agent and instead forward the INVITE to a voice mail server.

Upon receipt of the INVITE, the voice mail server might then respond to the proxy server with a "200 OK," which the proxy server would forward to the initiating user agent. In turn, the initiating user agent would then send a SIP "ACK" message to proxy server, which the proxy server would forward to the voice mail server. As a result, a media session would be established between the initiating SIP user and the voice mail server. Through that media session, the voice mail server would then play an outgoing message prompt and would receive and record a message for later retrieval by the terminating user. (In this regard, the voice mail server could interact with the caller by applying an interactive voice response unit (IVRU) or through execution of VXML applications, or in any other way desired.)

SUMMARY

An exemplary embodiment of the present invention is directed to a mechanism for facilitating services in a communications network. In accordance with the exemplary embodiment, an enhanced proxy server is provided. The enhanced proxy server includes or has access to a data store, which includes data that can be used by one or more application servers to facilitate carrying out a service in response to a signaling message provided by the proxy server.

Generally speaking, after the enhanced proxy server receives a signaling message related to a communication, it will send the signaling message along its way for receipt and handling by at least one application server. In addition, however, the enhanced proxy server will also extract from the data store a set of data (one or more pieces of information) that can be used by that application server to facilitate performance of a communication service in response to the signaling message. And the enhanced proxy server will make that data available for use by the application server.

In the exemplary arrangement, the signaling message can be a session initiation request message sent by or on behalf of a communicating entity (user and/or device). (For instance, the signaling message can be a SIP message, such as an INVITE or a MESSAGE.) And the data that the enhanced proxy server extracts from the data store can be data designated or established in advance for that communicating party.

By way of example, the signaling message could be a request to establish a group communication session (e.g., a PTT session), and the data could be a group-list designated for the communicating entity. The application server could then be a conference server (e.g., a PTT server) and could refer to that group list to determine the entities with which to establish conference legs. And the application server could then set up and bridge together those conference legs.

As another example, the signaling message could be a request by a communicating entity to send a communication (such as an instant message) to a group of users, and the data could similarly be a group-list designated for the communicating entity. The application server could then be a messaging server (e.g., an IM server) and could refer to that group-list to determine the recipients to whom the communication should be sent. And the application server could then multicast the message to those recipients.

As still another example, the signaling message could be a request to establish a communication session with a designated terminating entity. After forwarding the signaling message to the terminating entity and not receiving a response, the enhanced proxy server could then forward the signaling message instead to a voice mail server as the application server. Further, the data could be an outgoing media message that is customized for the originating entity and/or for the terminating entity. The voice mail server may then establish a media session with the originating entity and play that customized outgoing media message to the originating entity as a prompt to request a voice mail message.

The enhanced proxy server can make the data available for use by the application server in any of a variety of ways. As an example, the enhanced proxy server could publish the data on a message bus or in a data store accessible by the application server. In turn, the application server can access the data from that message bus or data store. And as another example, the enhanced proxy server could send the data to the application server either separately from the signaling message, or as a supplemental part of (e.g., appended to or embedded within) the signaling message.

These as well as other aspects and advantages of the exemplary embodiment will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
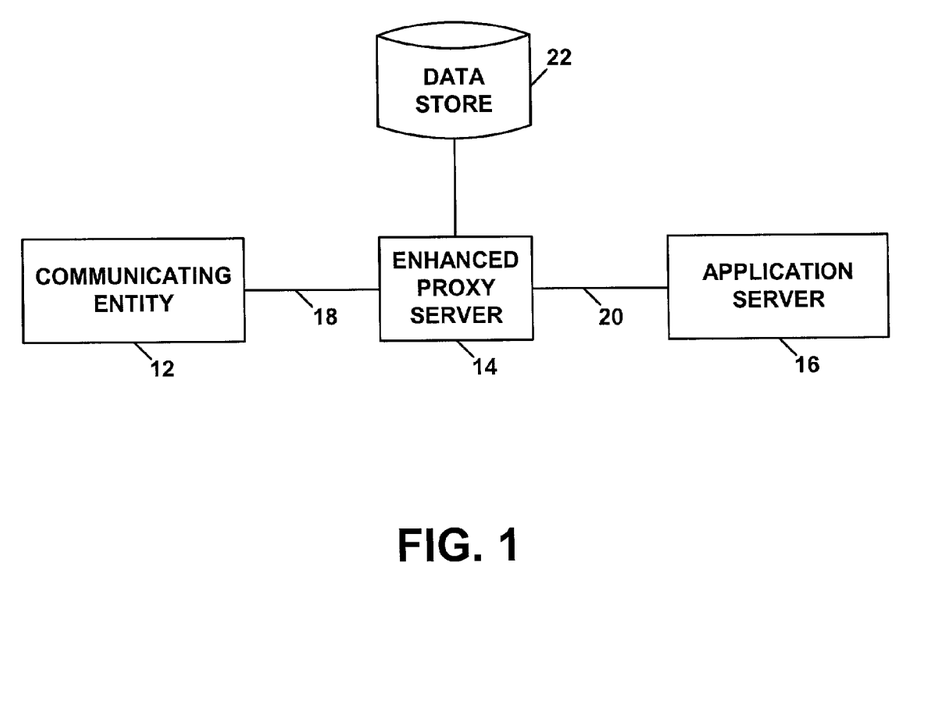
FIG. 1 is a block diagram depicting a network arrangement in accordance with the exemplary embodiment.

Referring to the drawings, FIG. 1 is a simplified block diagram of a communication system 10 arranged in accordance with an exemplary embodiment of the present invention. As shown in FIG. 1, system 10 includes a communicating entity 12, an enhanced proxy server 14, and an application server 16. The communicating entity 12 is shown communicatively coupled with the enhanced proxy server 14 by a signaling link 18, and the enhanced proxy server 14 is in turn shown communicatively coupled by a signaling link 20 with the application server 16. As further shown, enhanced proxy server 14 includes or has access to a data store 22, which includes data that can be used by application server 16 to facilitate performance of a communication service in response to a signaling message that is proxied by enhanced proxy server 14.

The various elements shown in FIG. 1 can take any of a variety of forms. By way of example, the element designated as communicating entity 12 can represent a user (e.g., a subscriber) and/or a communication device that a user would use to engage in communications. The communication device, in turn, could be a landline and/or wireless communication device. For instance, it could be a cellular or PCS mobile station, in the form of a telephone or other device equipped with wireless communication capability (such as a personal digital assistant or personal computer equipped with a wireless communication module (e.g., PC card or connected cell phone)). Or it could be a personal computer or other such entity with a landline network connection. Other examples are also possible.

Enhanced proxy server 14 may similarly take various forms. For instance, the enhanced proxy server can be a computer that is programmed with proxy server functionality and with data-publication functionality. The proxy server functionality would allow the enhanced proxy server to receive a signaling message indicative of a communication involving communicating entity 12 and to proxy the signaling message to an appropriate destination (possibly through another proxy), such as to application server 16. And the data-publication functionality would allow the enhanced proxy server to extract from data store 22 (e.g., through a suitable query) a set of data that can be used by application server 16 to carry out a communication service in response to the signaling message, and to make that data available for use by application server 16.

Application server 16 may also take any of a variety of forms. For instance, application server 16 might be a computer that is programmed to perform a service in response to an incoming signaling message and that is further programmed to obtain data made available by enhanced proxy server 14 and to use that data to facilitate performance of the service in response to the signaling message.

The particular service (or services) carried out by application server 16 can also take any of a variety of forms. Continuing with the examples introduced above, for instance, the service might be setting up and facilitating a group communication session, such as a PTT session, or it might be to multicast a message, such as an instant message, or it might be to prompt for and record a voice mail message. Many other service examples are possible as well or will be developed in the future. So these three examples should in no way be viewed as representing the only possible services or types of services that could be carried out by the application server.

In turn, the links 18 and 20 could also take various forms. In the exemplary embodiment, for instance, both links represent network connections, both possibly over a common network (e.g., WLAN or LAN), such as the Internet or an intranet (e.g., a carrier's core IP network). In this arrangement, communicating entity 12, enhanced proxy server 14 and application server 16 may each sit as nodes on the common network. Further, data store 22 may also sit as a node on the network or may be incorporated as part of enhanced proxy server 14 or otherwise accessible by enhanced proxy server 14. On the other hand, links 18 and 20 could take other forms as well, such as direct links between the various elements shown.

Figure 2:
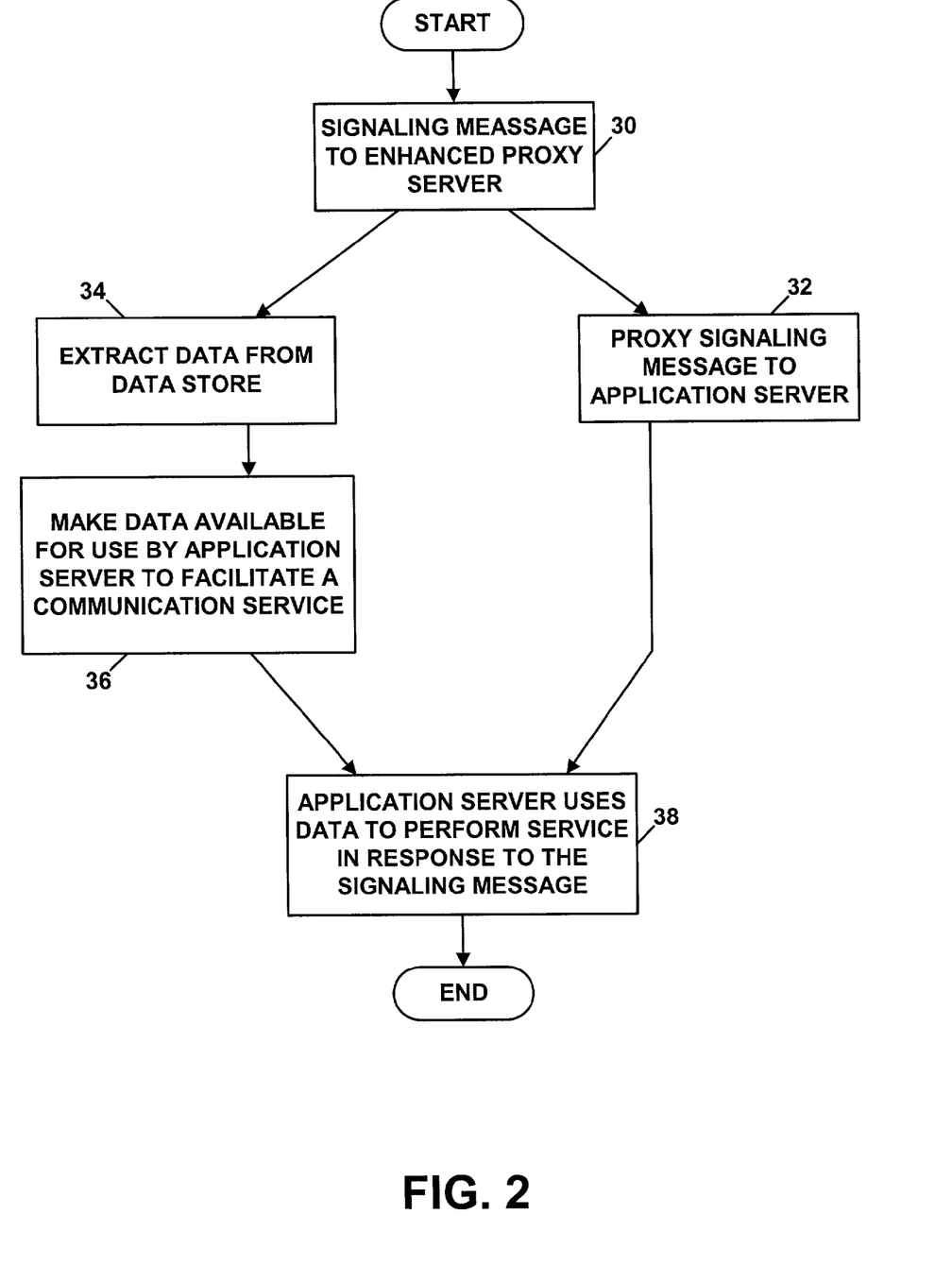
FIG. 2 is a flow chart depicting functions that can be carried out in the exemplary arrangement shown in FIG. 1.

Referring next to FIG. 2, a simplified flow chart is provided, to illustrate a set of functions that can be carried out in the arrangement shown in FIG. 1, in accordance with the exemplary embodiment. As shown in FIG. 2, at block 30, a signaling message is sent by or on behalf of communication entity 12 to enhanced proxy server 14. The signaling message preferably concerns a communication involving communicating entity 12. As such, the signaling message might be a session initiation message, a mid-session control message, or some other sort of message, whether or not it contains bearer data.

Communicating entity 12 itself might send the signaling message over link 18 to enhanced proxy server 14. Or, as noted above, some other entity might send the signaling message to enhanced proxy server 14 on behalf of communicating entity 12. For instance, although not shown in FIG. 1, a gateway could exist along link 18 somewhere between communicating entity 12 and enhanced proxy server 14 and could function to send the signaling message to enhanced proxy server 14, concerning a communication involving entity 12. Such a gateway might be in place in a situation where communicating entity 12 and enhanced proxy server 14 sit on disparate types of networks, such as where communication entity 12 sits on a circuit-switched network and enhanced proxy server 14 sits on a packet-switched network for instance.

Further, it should be understood that sending or receipt of "a signaling message" could equally mean sending or receipt of multiple signaling messages. For instance, a sequence of signaling messages together might have a given meaning and cause a given effect that any one of the signaling messages alone might not.

At some point after enhanced proxy server 14 has received the signaling message, enhanced proxy server 14 performs at least two functions. It proxies the signaling message along signaling link 20 to application server 16. And it extracts data from data store 22 (or otherwise selects a set of pertinent data) and makes that data available for use by application server 16 to enable application server 16 to carry out a service in response to the signaling message. Enhanced proxy server 14 may perform these functions concurrently or in sequence. For purposes of example, FIG. 1 shows the functions performed concurrently.

Thus as depicted at block 32, enhanced proxy server 14 proxies the signaling message along signaling link 20 to application server 16. Additionally, at block 34, enhanced proxy server 14 refers to data store 22 to obtain data that can be used by application server 16 to facilitate performing a communication service in response to the signaling message. And, at block 36 (possibly as part of block 32), enhanced proxy server 14 makes that data available for use by application server 16. Thereafter, at block 38, application server 16 uses the data to facilitate performing a communication service in response to the signaling message.

It should be understood that the above and other arrangements described herein are illustrative only, and other arrangements and other elements (e.g., machines, interfaces, functions, orders of functions, etc.) can be used instead, additional elements may be provided, and some elements may be omitted altogether. Further, as in most telecommunications applications, those skilled in the art will appreciate that many of the elements described herein represent functions or functional entities that may be implemented as discrete components or in conjunction with other components, in any suitable combination and location, and through hardware, software and/or firmware.

Figure 3:
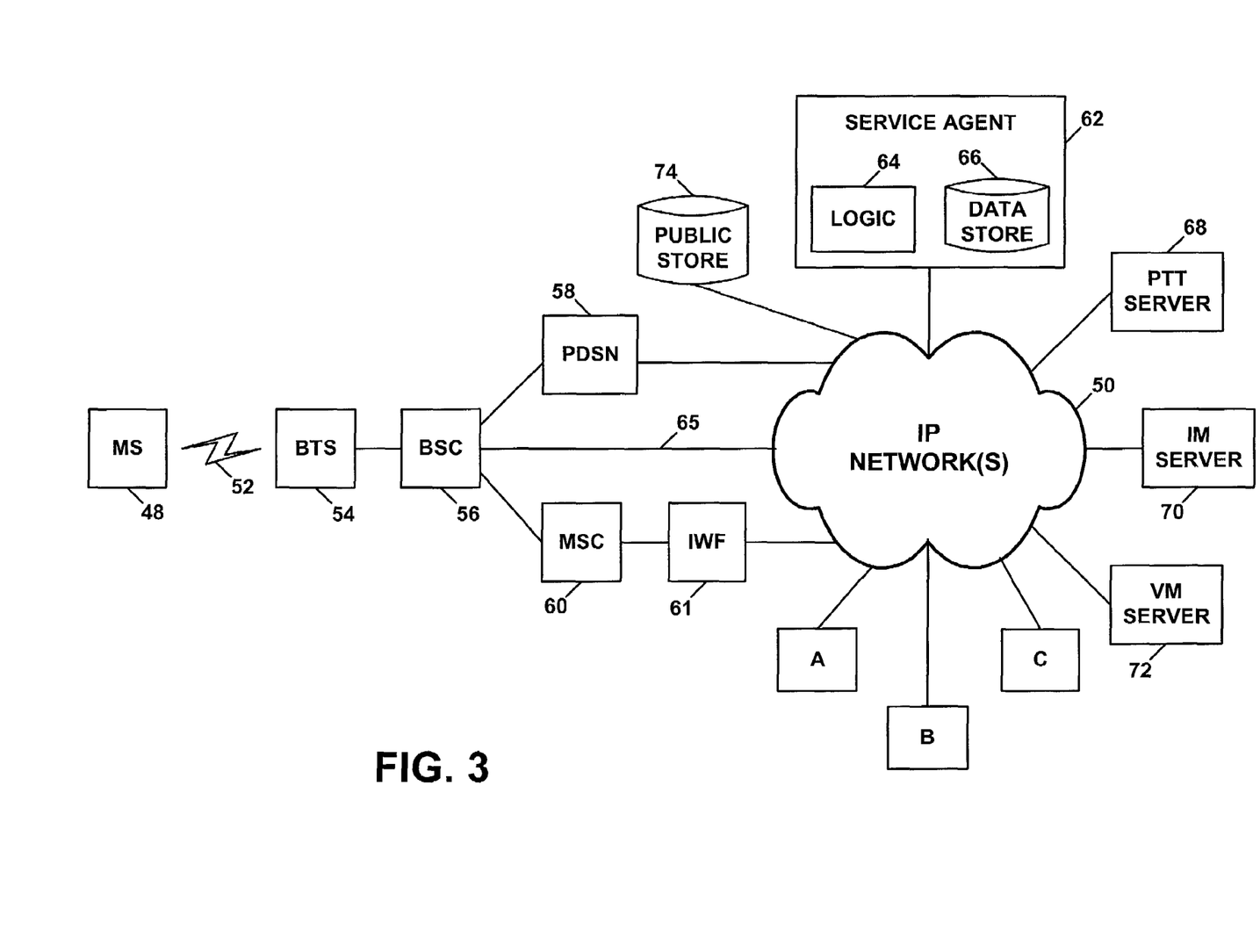
FIG. 3 is a block diagram depicting a more particular network arrangement in accordance with the exemplary embodiment.

Referring next to FIG. 3, another block diagram is provided, to help illustrate some of many possible network configurations that could be represented by the arrangement shown generally in FIG. 1.

FIG. 3 depicts communicating entity 12 as a wireless mobile station (MS) 48 (possibly in conjunction with a computer or other terminal (not shown)), which can communicate via a radio access network with entities on an IP network 50. More particularly, MS 48 communicates over a radio frequency air interface 52 with a BTS 54, which is coupled in turn with a BSC 56. The BSC is then coupled with a PDSN 58 that provides connectivity with IP network 50. (Alternatively, as further shown, the BSC may also be coupled with an MSC 60, which is linked with an interworking function (IWF) 61 that provides connectivity (directly or through PDSN 58) with the IP network, and/or the BSC may be linked directly to the IP network (by link 65) and may thereby itself provide connectivity to the IP network.)

With this arrangement, MS 48 may establish connectivity over air interface 48 and through BTS 54, BSC 56 and PDSN 58 with IP network 50. Further, MS 48 can establish a datalink layer connection, such as a point-to-point protocol (PPP) or serial line interface protocol (SLIP) channel with PDSN 58, and can establish a network layer connection so as to engage in packet-data communications over IP network. MS 48 may work to establish these connections automatically upon power up (so as to provide an "always on" network connection) or in response to user instruction.

In the exemplary embodiment, MS 48 preferably includes a processor as well as a set of program instructions stored in memory and executable by the processor to carry out various functions described herein. For instance, an exemplary MS 48 may include a SIP user agent application, which can function to send SIP signaling messages to a designated SIP proxy on IP network 50, for transmission in turn to a desired endpoint, and to receive SIP signaling messages from IP network 50.

Additionally, the MS 48 may include various other client-level applications, such as a PTT application for initiating and supporting PTT communications, an IM application for sending and receiving IM communications, and a telephony application for engaging in telephone communications. Or the MS 48 could be a thin client and can download these sorts of client-level applications (e.g., as Java/J2ME applets) from suitable network servers. When executed by the processor, these various other client-level applications may invoke the SIP user agent or employ some other signaling process to send into IP network 50 a signaling message that is indicative of a communication involving MS 48 or a user of MS 48.

In the exemplary arrangement of FIG. 3, the function of the enhanced proxy server 14 is embodied within a "service agent" platform 62, which sits on IP network 50 and which includes logic 64 and a data store 66. Logic 64 may take the form of a processor and machine language instructions stored in memory and executable by the processor to carry out various function described herein. As noted above, those functions preferably include (i) a proxy server function and (ii) a data-publication function.

The proxy server function may be encoded in a SIP proxy server application executable by the processor. As such, the service agent may receive a SIP message that designates a destination SIP address (e.g., a SIP ID), may then refer to a SIP registry (also possibly resident on the service agent) to find out where to send the SIP message. In turn, the service agent may then send the SIP message to that destination point. Continuing with the examples above, for instance, the SIP message might be an INVITE or MESSAGE, which, based on the contents of the message and/or on other factors, the service agent might proxy to an appropriate application server, such as PTT server 68, IM server 70 and/or VM server 72.

In the exemplary embodiment, MS 48 may be programmed to send some or all outgoing SIP messages to service agent 62 as a local SIP proxy for MS 48. Alternatively, some other mechanism could exist to push SIP messages to the service agent for handling. For instance, PDSN 58 could be programmed to detect that a packet communication from MS 48 is a SIP message and to responsively push that packet communication to service agent 62.

The data-publication function of the service agent may also take various forms. Generally speaking, the idea is that the service agent will make data available for use by an application server, to enable (partially or fully) the application server to carry out a communication service in response to a signaling message that the service agent proxies (directly or indirectly (through another proxy)) to the application server.

To do this, the service agent could add the data into the signaling message that it sends (as a proxy server) to the application server, so that the application server will receive the signaling message together with the data. Alternatively, the service agent could send the data to the application server in a separate communication over IP network 50. Such a communication can conform with any agreed protocol.

Still alternatively, the service agent could more literally publish the data in another data store that is accessible by the application server. For example, FIG. 3 depicts a "public store" 74 on IP network 50, to which the service agent could publish the data and from which an application server could read the data. (Note that, while the public store is shown outside of service agent 62, the public store could equally be incorporated as part of service agent 62.) The public store might be a database or directory to which service agent 62 can write data and from which the application server has authority to read data. In this regard, the service agent and/or application server could have partial or full access/permissions, which can be set in any manner now known or later developed.

And as another example, the service agent might publish the data on a message bus that is accessible by the application server. In this regard, a message bus architecture with which people of ordinary skill in the art are familiar is described in "A Message Bus for Local Coordination—draft-ietf-mmusic-mbus-transport-06.txt," published on May 30, 2001, by the Multiparty Multimedia Session Control (MMUSIC) working group of the Internet Engineering Task Force. A message bus has the advantage of providing very quick access to data, similar to cache memory in a personal computer.

In the exemplary embodiment, the data that the service agent makes available for use by the application server can be data that the application server requires in order to be able to carry out a given communication service. For example, if the application server is PTT server 68 and the communication service is setting up a PTT session among a group, the data could be a group-list for the originating party. Similarly, if the application server is IM server 70 and the communication service is multicasting an instant message to a group, the data could also be a group-list for the sending party.

Alternatively, the data could function to assist the application server in carrying out the communication service or to somehow qualify or modify the communication service. For example, if the application server is PTT server 68, the data could specify the online status or preferences of any of the group members. If the data indicates that a particular group member is not online or is currently engaged in another session, the PTT server could then act accordingly as it works to set up the PTT session (or to modify the PTT session, where the signaling message that the service agent proxies to it is a mid-session control signal, such as a PTT floor control message).

As another example, if the application server is VM server 72 and the communication service includes prompting for a message and recording the message, the VM server might have a default outgoing message that it normally plays to any calling party. In that case, the data that the service agent makes available for use by the VM server could be a custom outgoing media message that has been established at least in part for the calling party and/or for the called party, and the VM server may be programmed to responsively use that custom outgoing message instead of the default outgoing message.

For instance, if the calling party is John Doe, the custom outgoing message could be an audio stream that states "Sorry John, the party you are calling is currently unavailable. Please leave a message after the following tone" and then ends with a custom tone that John Doe had selected in advance through a suitable web interface.

And as a related example, if the VM server is a VXML-based voice command platform, the VM server might have a default VXML application that it executes when it receives a call. In that case, the data that the service agent makes available for use by the VM server could be a custom VXML document that is executable by the VM server to cause the VM server to take certain actions (e.g., actions specific to the calling party and/or called party). Other examples are possible as well.

In the exemplary embodiment, data store 66 may hold the data that the service agent will make available for use by the application server. As such, data store 66 may normally hold an assortment of data, and the service agent may extract from the data store a particular set of data to make available in a given instance. For example, the data store may hold data that is specific to all users or all devices that subscribe to a given carrier as well as variations of data suitable for use by assorted different application servers and in a variety of different scenarios.

When service agent 62 proxies (or will proxy) a signaling message to an application server, the service agent may query the data store to obtain a set of pertinent data that it should make available. The query can be keyed to any of a variety of factors, examples of which include (i) the identity of the communicating entity 12, (ii) the contents of the signaling message, such as the type of communication at issue, (iii) the identity or type of the application server, (iv) the identity or type of service that the application server will perform, and (iv) the current time/date. Many other examples are possible as well.

For example, data store 66 could hold a table that lists authorized communicating entities (e.g., users and devices). And the data store could hold another table that specifies buddy lists per communicating entity. And still further, the data store could hold another table that points to stored media files usable as outgoing messages by a VM server. Additionally, the data store could hold another table that specifies in a given instance (e.g., for a given communicating entity, application server, communication service, etc.) which data from the other tables the service agent should make available for use by the application server.

In the exemplary embodiment, the data in data store 66 could be updated regularly, or in response to some triggering event (such as an add, delete or modify event). For instance, the service agent can update the data based on an automated analysis of past transactions (e.g., as defined by signaling messages that pass to or through the service agent or by other information). Or subscribers could access and update their particular data (e.g., buddy lists) via a suitable provisioning interface (e.g., via a web server that then provides updated data to service agent 62, or through interaction with a customer service operator) and/or via a mobile handset.

Alternatively or additionally, the data that the service agent makes available for use by the application server could be defined by a more static set of logic. For instance, logic 64 could include program code that requires the service agent to publish a particular set of data in one instance (e.g., for one given communicating entity, application server or communication service) and to publish another particular set of data in another instance (e.g., for a different communicating entity, application server or communication service).

Figure 4:
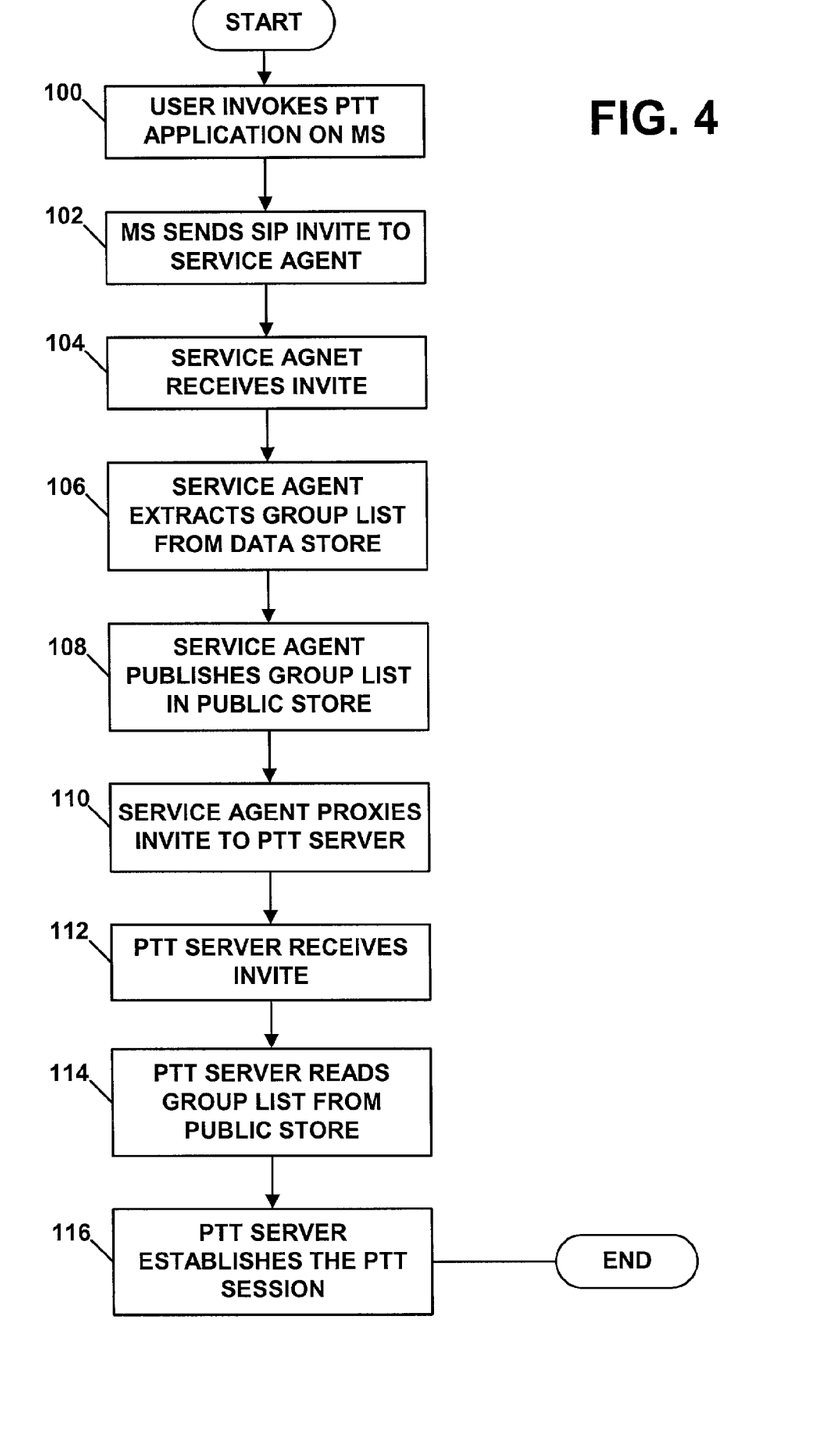
FIG. 4 is a flow chart depicting functions that can be carried out in setting up a PTT session in the arrangement shown in FIG. 3.

Referring now to FIG. 4, a flow chart is provided to help illustrate how the exemplary embodiment could function during initiation of a PTT session in the arrangement shown in FIG. 3. As shown in FIG. 4, at block 100, a user of MS 48 invokes a PTT application on MS 48. At block 102, the PTT application then responsively sends a SIP INVITE or other signaling message to service agent 62. (For instance, the PTT application may invoke a SIP user agent application to send a suitable SIP INVITE). In the exemplary embodiment, the signaling message identifies MS 48 and/or the user as the source (communicating entity) and identifies the destination and/or type of communication as a PTT session.

At block 104, service agent 62 then receives the signaling message and proceeds to parse and evaluate the message, noting that the message is a PTT initiation message from the designated communicating entity. In turn, at block 106, service agent 62 queries data store 66 to extract a group list that has been designated in advance for the communicating entity. The group list might identify entities A, B and C as the members of the communicating entity's group. Further, by querying a profile record for the communicating entity, service agent 62 may determine that PTT server 68 (at a particular network address) has been designated to handle PTT sessions for that communicating entity.

At block 108, service agent 62 then publishes the communicating entity's group list in public store 74. For instance, service agent 62 may write the group list to a suitably named file or database table in public store 74. Further, service agent 62 may insert into the signaling message a pointer to the data in public store 74. And at block 110, service agent 62 proxies the signaling message to PTT server 68.

At block 112, PTT server 68 then receives the signaling message and detects that it is a request to initiate a PTT session for the designated communicating entity. Further, PTT server 68 notes that the message points to the communicating entity's group list in public store 74. Thus, at block 114, PTT server 68 then reads the group list from public store 74. And at block 116, PTT server 68 then sets up the PTT session between the communicating entity and entities A, B and C.

Figure 5:
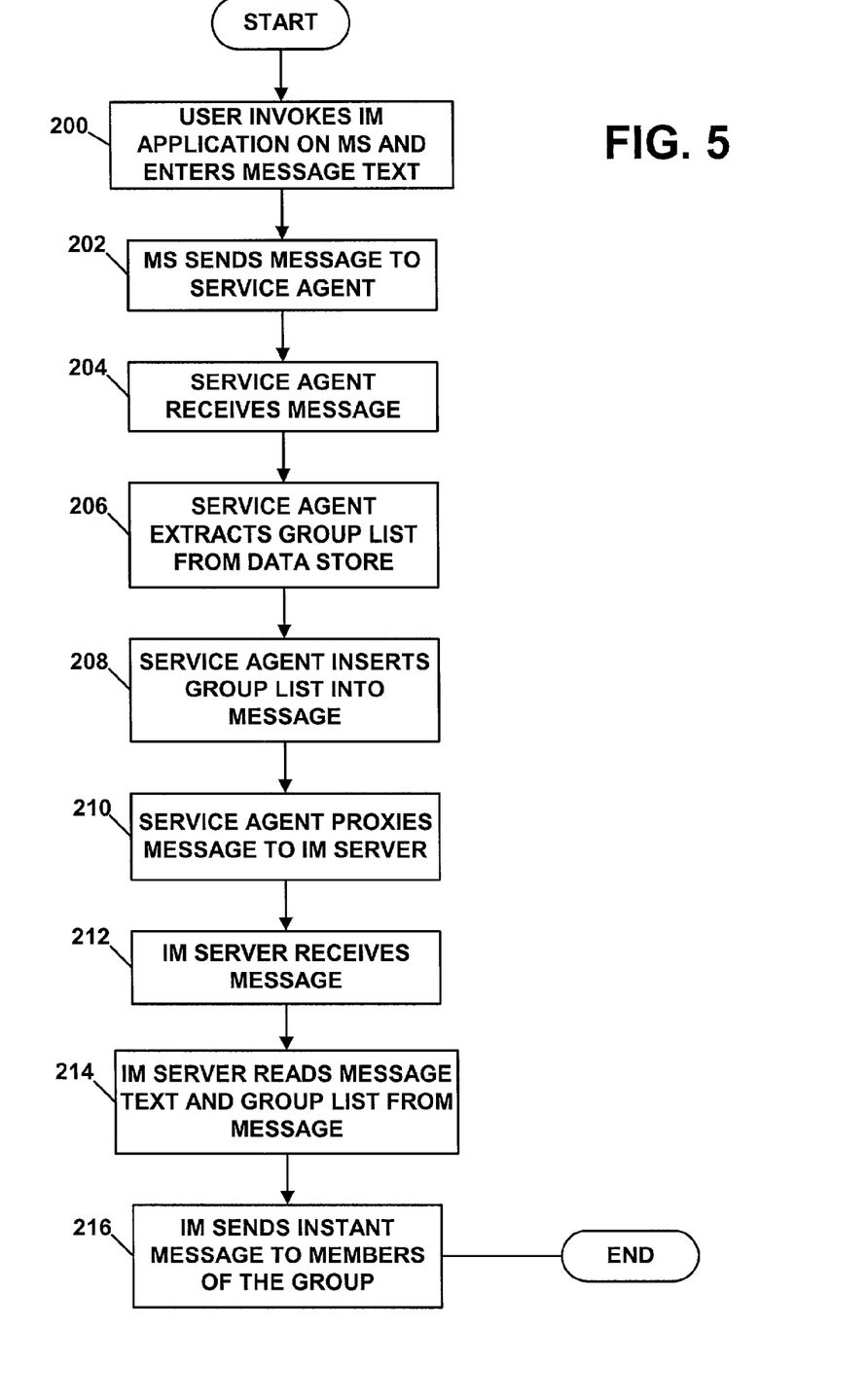
FIG. 5 is a flow chart depicting functions that can be carried out in multicasting an instant message in the arrangement shown in FIG. 3.

Referring next to FIG. 5, another flow chart is now shown, to help illustrate how the exemplary embodiment could function in multicasting of an instant message in the arrangement shown in FIG. 3. As shown at block 200, a user of MS 48 invokes an IM application on MS 48 and enters an instant message to send to the user's group of buddies. At block 202, the IM application then responsively sends a SIP MESSAGE or other signaling message to service agent 62. In the exemplary embodiment, the signaling message identifies MS 48 and/or the user as the source (communicating entity), identifies the type of communication as a multicast instant message, and carries an ASCII text version of the message entered by the user.

At block 204, service agent 62 then receives the signaling message and proceeds to parse and evaluate the message, noting that the message is a multicast instant message from the communicating entity. In turn, at block 206, service agent 62 queries data store 66 to extract a group list that has been designated in advance for the communicating entity. For a multicast instant message from the communicating entity, that group list might identify entities A and B as the members of the communicating entity's group.

At block 208, service agent 62 may then insert the group list into the signaling message. For instance, the service agent may add an ASCII text version of the group list directly into the message. And at block 210, the service agent may then proxy the signaling message to IM server 70. Thus, at block 212, IM server 70 receives the signaling message.

At block 214, after receipt of the signaling message, IM server 70 reads the group list and message text from the signaling message. And, at block 216, IM server 70 then responsively sends to entities A and B an instant message containing the designated message text.

Figure 6:
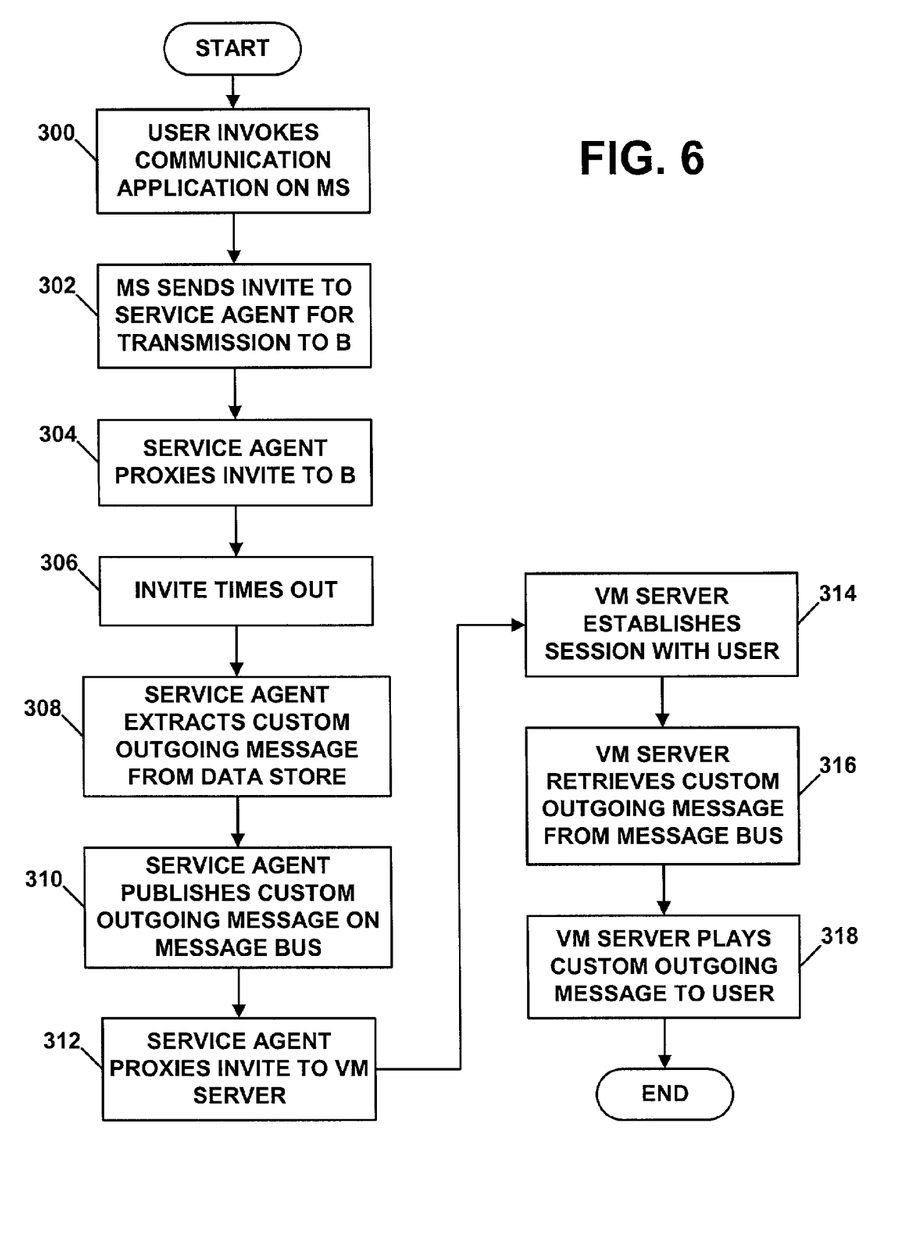
FIG. 6 is a flow chart depicting functions that can be carried out in providing voice mail service in the arrangement shown in FIG. 3.

Finally, referring to FIG. 6, another flow chart is provided, to help illustrate how the exemplary embodiment could function in facilitating voice mail service. As shown at block 300, a user of MS 48 invokes a communication application on MS 48, seeking to establish a communication session over IP network 50 with a user who happens to be operating entity B. Thus, at block 302, the communication application responsively causes a SIP user agent on MS 48 to send a SIP INVITE to service agent 62, designating the user of MS 48 as the source and the user of entity B as the destination.

When the service agent receives the SIP INVITE, the service agent then identifies entity B as the destination SIP user agent. Thus, at block 304, the service agent then sends the INVITE to entity B. At block 306, a predefined timeout period expires with no response from entity B. Thus, the service agent determines that alternative processing of the session request is required.

At block 308, the service agent then queries data store 66 to determine which VM server to use and to obtain any data that the service agent should make available for use by that VM server to facilitate response to the INVITE. For instance, the initiating user's profile may point to VM server 72 and may also point to a customized outgoing message audio file stored in data store 66.

At block 310, the service agent may then publish the customized outgoing message audio file on a message bus for access by VM server 72. And at block 312, the service agent may proxy the INVITE to VM server 72.

Upon receipt of the INVITE, at block 314, VM server 72 may then exchange further messages with the initiating SIP user agent, so as to establish a media session with MS 48. And, at block 316, VM server 72 may retrieve the customized outgoing message audio file from the message bus. In turn, at block 318, VM server 72 may then play out the customized outgoing message to the initiating user, so as to prompt the initiating user to leave a voice mail message.

An exemplary embodiment of the present invention has been described above. It should be understood, however, that changes and modifications can be made to this exemplary embodiment without departing from the true scope and spirit of the present invention, which is defined by the claims.

For example, while the foregoing discussion focuses mainly on operation of an enhanced proxy server, the principles described can be extended to use with respect to an enhanced registration server. For instance, when a SIP user registers with a SIP registration server, the SIP registration server may responsively extract from a data store a set of data particular to that SIP user and then make that data available for use by an application server that may handle signaling messages concerning the SIP user. As noted above, the service agent might include a registration server. So a service agent may perform this function.

As a particular example, when a SIP user sends a SIP REGISTER message to a registration server on service agent 62, service agent 62 may then responsively query the user's profile and determine that the user is a PTT user (or that the user's device supports PTT service). In response to that determination, the service agent may then extract the user's buddy list from data store 66 and publish that buddy list to public store 74. Thereafter, when PTT server 68 seeks to set up a PTT session for the user, PTT server 68 can obtain the user's group list from public store 74 and use the group list to facilitate setting up the PTT session.

We claim:

1. A method comprising:
   receiving into a network entity a signaling message indicative of a network communication;
   the network entity responsively extracting from a data store a set of data usable by an application server to carry out a communication service in response to the signaling message; and
   the network entity (i) outputting the signaling message for transmission over a network to the application server and (ii) making the set of data available for use by the application server in carrying out the communication service in response to the signaling message.

2. The method of claim 1, wherein the communication service is selected from the group consisting of (i) a group conferencing service, (ii) a multicasting service, and (iii) a voice mail service.

3. A method comprising:
   receiving an initiation message indicative of a request by an entity to engage in a communication;
   responsively extracting from a first data store a set of data usable by an endpoint application to set up the communication; and
   outputting the session initiation message for transmission to the endpoint application and making the set of data available for use by the endpoint application to set up the communication.

4. The method of claim 3, wherein the entity comprises a SIP user, and the initiation message comprises a SIP INVITE request.

5. The method of claim 3, wherein making the set of data available for use by the endpoint application to set up the communication comprises:
   sending the set of data to the endpoint application.

6. The method of claim 3, wherein making the set of data available for use by the endpoint application to set up the communication comprises:
adding the set of data to the initiation message that is output for transmission to the endpoint application.

7. The method of claim 3, wherein making the set of data available for use by the endpoint application to set up the communication comprises:
publishing the set of data to a second data store that is accessible by the endpoint application.

8. The method of claim 3, wherein making the set of data available for use by the endpoint application to set up the communication comprises:
sending to the endpoint application a pointer to the set of data in the second data store.

9. The method of claim 3, wherein making the set of data available for use by the endpoint application to set up the communication comprises:
publishing the set of data on a message bus accessible by the endpoint application.

10. The method of claim 3, wherein the communication comprises a push-to-talk (PTT) session, the endpoint application comprises a PTT server, and the set of data comprises a PTT group-list designated for the entity.

11. The method of claim 3, wherein the communication comprises an instant-messaging (IM) communication, the endpoint application comprises an IM server, and the set of data comprises an IM group-list designated for the entity.

12. A method comprising:
transporting an initiation message over a radio access network from a wireless mobile station to a packet-switched network, the initiation message being indicative of a request from a user of the wireless mobile station to engage in a communication;
transmitting the initiation message over the packet-switched network to a signaling proxy server, and receiving the initiation message into the signaling proxy server;
in response to the initiation message, the signaling proxy server extracting from a data store a set of data usable by an application server to set up the communication; and
the signaling proxy server forwarding the initiation message to the application server and making the set of data available for use by the application server in responding to the initiation message.

13. The method of claim 12, further comprising:
the application server receiving the initiation message and using the set of data to set up the communication.

14. The method of claim 13, wherein the set of data comprises a buddy-list designated for the user.

15. The method of claim 14, wherein the application server comprises a push-to-talk server (PTT) and the communication comprises a PTT session.

16. The method of claim 14, wherein the application server comprises an instant messaging (IM) server, and the communication comprises an IM communication.

17. A system comprising:
a processor;
data storage;
user-profile data stored in the data storage;
proxy-server logic stored in the data storage and executable by the processor to receive a session initiation message and to responsively output the session initiation message for transmission via a packet-switched network to an endpoint application, the session initiation message being indicative of a request to set up a communication involving a user; and
data-management logic stored in the data storage and executable by the processor, in response to receipt of a session initiation message, (i) to extract from the user-profile data a set of data usable by the endpoint application to facilitate set-up of the communication and (ii) to make the set of data available for use by the endpoint application in responding to the session initiation message.

18. The system of claim 17, wherein the set of data comprises a buddy-list designated for the user.

19. The system of claim 17, wherein the communication comprises a push-to-talk (PTT) communication session, and wherein the endpoint application comprises a PTT server.

20. The system of claim 17, wherein the communication comprises an instant-messaging (IM) communication, and wherein the endpoint application comprises an IM server.

21. The system of claim 17, wherein the data-management logic is executable to make the set of data available by placing the set of data on a message bus accessible over the packet-switched network by the endpoint application.

22. The system of claim 17, wherein the data-management logic is executable to make the set of data available by publishing the set of data to a data store accessible by the endpoint application.

23. The system of claim 22, further comprising the data store.

24. The system of claim 17, wherein the data-management logic is executable to make the set of data available by inserting the set of data in the session initiation message that the processor outputs for transmission to the endpoint application.

25. The system of claim 17, wherein the session initiation message is a SIP INVITE request message.

26. In a networked platform of the type having proxy-server functionality to receive a session initiation message and to forward the session initiation message to an application server, wherein the application server then performs a service in response to the session initiation message, the improvement comprising:
data-management logic executable by the platform, in response to receipt of the session initiation message, (i) to extract from a profile store data usable by the application server to facilitate performance of the service and (ii) to make the data available for use by the application server to facilitate performance of the service.

27. The improvement of claim 26, wherein the session initiation message indicates a request by a communicating entity, and wherein the data that the platform extracts from the profile store is data designated for the communicating entity.

28. The improvement of claim 27, wherein the request by the communicating entity comprises a request to establish a group communication session, wherein the data comprises a group list designated for the communicating entity, the group list being usable by the application server to facilitate establishment of communication legs for the group communication session.

29. The improvement of claim 27, wherein the request by the communicating entity comprises a request to send a communication to a plurality of users, wherein the data comprises a group list designated for the communicating entity, the group list indicating the plurality of users and being usable by the application server to facilitate sending of the communication to the plurality of users.

30. The improvement of claim 29, wherein the communication comprises an instant-message.

31. The improvement of claim 26, wherein the platform makes the data available for use by the application server by sending the data to the application server.

32. The improvement of claim 26, wherein the platform makes the data available for use by the application server by adding the data to the session initiation message that the platform forwards to the application server.

33. The improvement of claim 26, wherein the platform makes the data available for use by the application server by publishing the data to a data store that is accessible by the application server.

34. The improvement of claim 26, wherein the platform makes the data available for use by the application server by publishing the data to a message bus that is accessible by the application server.

35. The improvement of claim 26, wherein the proxy server functionality is SIP proxy server functionality, and wherein the session initiation message is a SIP INVITE request message.

36. A method comprising:
  receiving into a registration server a signaling message indicating that a user is online in a communication network; and
  the registration server responsively extracting from a data store a buddy-list designated for the user, and the registration server making the buddy-list available for use by an application server in setting up a communication for the user.

37. The method of claim 36, wherein making the buddy-list available for use by the application server in setting up a communication for the user comprises:
  publishing the buddy list to a data store that is accessible by the application server.

38. The method of claim 36, wherein making the buddy-list available for use by the application server in setting up a communication for the user comprises:
  publishing the buddy-list accessible to the application server on a message bus.

39. The method of claim 36, wherein making the buddy-list available for use by the application server in setting up a communication for the user comprises:
  sending the buddy-list to the application server.

40. The method of claim 36, wherein the communication comprises a push-to-talk (PTT) session, and the application server comprises a PTT server.

41. The method of claim 36, wherein the communication comprises an instant messaging (IM) communication, and the application server comprises an IM server.

\* \* \* \* \*

UNITED STATES PATENT AND TRADEMARK OFFICE
CERTIFICATE OF CORRECTION

PATENT NO.       : 7,634,568 B2                                            Page 1 of 1
APPLICATION NO. : 10/071833
DATED            : December 15, 2009
INVENTOR(S)      : McConnell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2312 days.

Signed and Sealed this

Ninth Day of November, 2010

David J. Kappos
*Director of the United States Patent and Trademark Office*